Oct. 9, 1962  W. SWAROFSKY ETAL  3,057,277
PHOTOGRAPHIC CAMERA HAVING A FRAME COUNTER
FOR INDICATING THE FILM SUPPLY
Filed June 30, 1960  2 Sheets-Sheet 1

INVENTORS
Walter Swarofsky and
Dietrich Bluhm

By Blum, Moscovitz, Friedman
& Blum
Attorneys

Oct. 9, 1962  W. SWAROFSKY ETAL  3,057,277
PHOTOGRAPHIC CAMERA HAVING A FRAME COUNTER
FOR INDICATING THE FILM SUPPLY
Filed June 30, 1960  2 Sheets-Sheet 2

INVENTORS
Walter Swarofsky and
Dietrich Bluhm
By Blum, Moscovitz, Friedman,
& Blum
Attorneys United States Patent Office 3,057,277
Patented Oct. 9, 1962

3,057,277
PHOTOGRAPHIC CAMERA HAVING A FRAME COUNTER FOR INDICATING THE FILM SUPPLY
Walter Swarofsky, Braunschweig, and Dietrich Bluhm, Braunschweig-Volkmarode, Germany, assignors to Voigtlander A.G., Braunschweig, Germany, a corporation of Germany
Filed June 30, 1960, Ser. No. 39,877
Claims priority, application Germany July 2, 1959
10 Claims. (Cl. 95—31)

This invention relates to frame or picture counters for photographic cameras and, more particularly, to an improved and simplified means for indicating the number of pictures remaining upon a film and useable with films of different lengths having different numbers of frames or pictures available.

In a known prior art picture or frame counter, the scale carrier is moved in the counter direction against the force of a return spring. This return spring, upon opening the back wall of the camera, automatically returns the scale carrier to its initial or starting position. However, frame or picture counters of this type can be used only with films having the same number of picture areas.

Frame counters which are to be used with films of varying length must start from a position corresponding to the scale value in turn corresponding to the number of frames on the particular film. In other words, their initial setting must be at the beginning of the scale corresponding to a particular length film, and thus these frame counters must operate from different initial or starting position. The starting position in each instance must be selected by corresponding adjustment of the counting disk, and it has not been possible to provide for automatic return of the scale counter or counting disk to the same initial starting position, such return needing to be effected manually. If, when the film is placed in the camera, the counting disk or scale carrier is not adjusted to a starting position corresponding for the particular number of pictures on the inserted film, or is incorrectly adjusted, the film or frame counter will read incorrectly and this may result in loss of available pictures.

It is also known in cameras, provided with frame counters which indicate the number of pictures or frames already exposed, to move the frame counter against the force of a returning spring and to operate locking means, preventing return movement of the frame counter, in dependence upon the opening and closing of the camera back wall. In the closed position of the back wall, this locking means is rendered effective and, when the back wall is opened, the locking means is rendered ineffective or released so that the frame counter may be returned by its spring to its initial or starting position.

In another known type of frame or picture counter, the viewing window is adjustable with respect to varying sizes of frames or pictures. Thus, depending upon the selective size of the frame on the film, different numbers of pictures can be exposed on films of the same length. The scale disk of the counting mechanism, in this case, carries several scales which have divisions corresponding to the different lengths of the frames or pictures. A cover plate is placed over the scale disk and has a window coordinated with each scale, and this cover disk is adjustable so that only the scale corresponding to the particular image or frame size is exposed.

In accordance with the present invention, a frame or picture counter is provided which is adjustable in accordance with different numbers of frames of a film and is always started from the same initial position. More particularly, in accordance with the present invention a scale carrier having a single scale is cooperable with at least two different relatively fixed reading points or indicator positions determined by reading marks, and only one indicator position at a time is operable.

In a preferred arrangement, at least two stationary indicators are associated with the movable scale carrier and these two marks, in the initial position of the scale carrier and during the movement thereof, point to different scale values. A cover means is provided and is adjustable to expose one indicator at a time and to block view of the other indicator.

In a further embodiment of the invention, a graduated ring is arranged coaxially with the rotatable scale carrier, and this ring carries an indicator which, by adjustment of the graduated ring, can be arranged at different fixed points along the scale carrier. An adjusting handle is provided for the graduated ring.

The invention arrangement can be applied to film or picture counting devices of various designs and constructions but in which the scale carrier, when released is always returned to the same starting position, this release being effected by the opening of the back wall of the camera.

For an understanding of the principles of the invention, reference is made to the following description of typical embodiments thereof as illustrated in the accompanying drawings. In the drawings.

Figure 1:
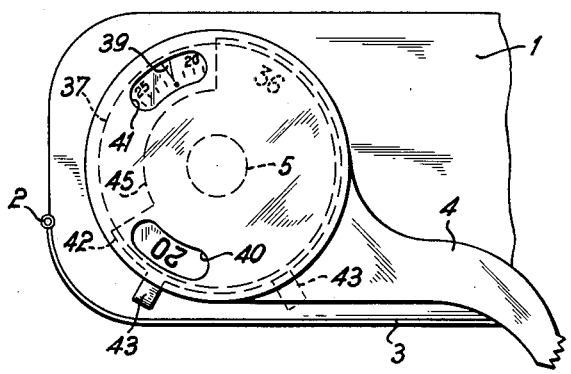
FIG. 1 is a bottom plan view of a photographic camera provided with a film feed lever and a film counting mechanism in accordance with the present invention.
Figure 2:
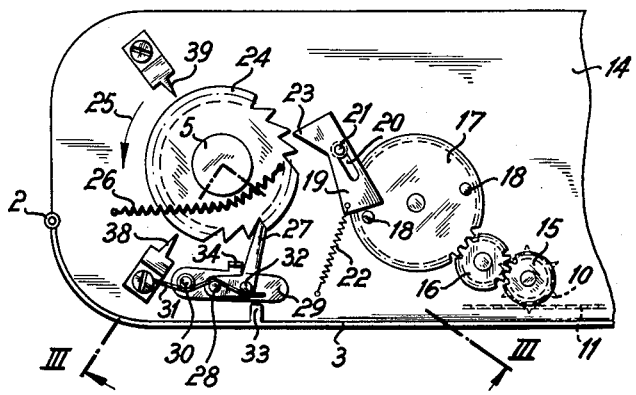
FIG. 2 is a bottom plan view of the film counting mechanism, with the bottom surface of the camera being broken away and the film feed lever being omitted.
Figure 3:
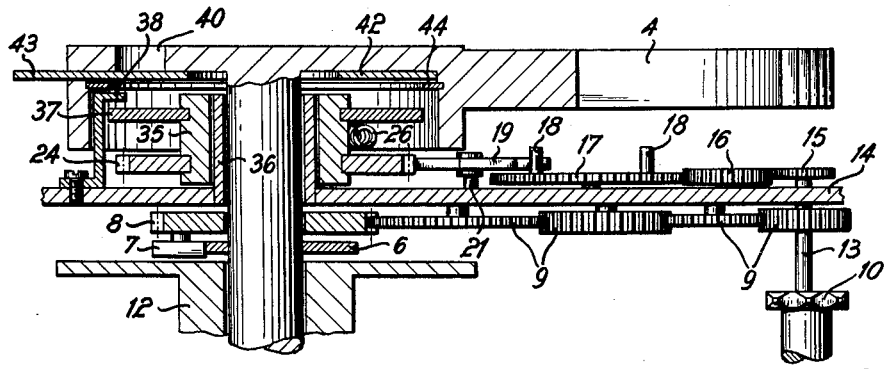
FIG. 3 is a sectional view, on a relatively enlarged scale, taken on the line III—III of FIG. 2.

Referring first to the embodiment of the invention shown in FIGS. 1, 2, and 3, the camera casing is illustrated as having a bottom wall 1 to which a back wall is hinged by means of a hinge 2, the back wall 3 being shown in closed position. A film feed lever 4 is mounted on the bottom wall 1 and is capable of being oscillated. A ratchet wheel 6 is non-rotatably secured to the shaft 5 of lever 4, and a pawl 7 cooperable with ratchet wheel 6 is oscillatably mounted on a spur gear 8 freely rotatable on shaft 5. The parts 6, 7, and 8 form a conventional one-way coupling so that, when film feed lever 4 is oscillated, spur gear 8 will be moved in one direction only. Gear 8 rotates, through intermediate gears 9, a pinion or pin wheel 10 engaging the perforations of film 11 (FIG. 2) so that the film is advanced while it is simultaneously wound on a film pick-up spool 12 freely rotatable on shaft 5.

Pinion or pin wheel 10 is secured to a shaft 13 which extends through a partition 14 and has secured to its other end a gear 15. Through an idler gear 16, gear 15 drives a spur gear 17. The transmission ratio of gears 8, 9, 15, 16, and 17 is so selected that, during a single oscillation of film feed lever 4, film 11 is transported by the length of one image area or frame, and with spur gear 17 making one-half a revolution. During this one-half revolution of gear 17, one of a pair of diametrically opposite pins 18 thereon engages a control lever 19 or pawl in the path of movement of pins 18. Lever 19 has an elongated slot 20 therein receiving a bolt 21 fastened on partition 14, and is normally biased in a direction away from a ratchet wheel 24 by a spring 22. Lever 19 is thus slidable and oscillatable relative to pin or bolt 21.

In each oscillation of pawl 19, resulting from a half revolution of gear 17, a pin 18, striking the pawl 19 moves the latter in such a direction that its tooth or nose 23 engages and advances ratchet wheel 24 to move the latter by the distance between adjacent teeth in the direction of arrow 25. This movement is effected against the tension of spring 26 acting on the ratchet wheel 24 and tending to move this ratchet wheel in a direction opposite to the direction of motion imparted to it by the lever 19.

Reverse movement of ratchet wheel 24 is prevented by a pawl 27 spring biased to engage the teeth of the ratchet wheel. Pawl 27 is oscillatable about a bolt 28 on a lever 29, and lever 29 is also oscillatably mounted on a bolt 30 fastened in partition 14. A spring 31, engaged with a pin or bolt 28 on lever 29, tends to move or oscillate lever 29 in a direction toward camera back wall 3. However, this same spring 31 holds pawl 27 resiliently engaged with a tooth of ratchet wheel 24, by virtue of the spring 31 engaging a pin 32 on the pawl 27.

In the range of oscillatory movement of lever 29, the camera back wall 3 carries a projection 33 which holds the parts in the position shown in FIG. 2 when the camera back wall 3 is closed. When back wall 3 is opened, spring 31 moves lever 29 and, by means of a lug 34 on lever 29, the pawl 27 in a direction such that the latter disengages ratchet wheel 24 and this wheel is turned in a reverse direction by the tensioned spring 26 to return the ratchet wheel to an initial starting position.

As best seen in FIG. 3, ratchet wheel 24 is fixed to a ring 35 which is rotatable about a sleeve or bushing 36 extending through partition 14 and forming a bearing for shaft 5. Also secured to sleeve 35 is an annular scale disk 37 of the film counter. Disk 37 is cooperable with a pair of indicators 38 and 39 (FIG. 2) mounted on partition 14, and with two reading windows 40 and 41 formed in the film feed lever 4. Mounted inside the film feed lever 4 is a cover disk 42 having an adjusting handle 43 projecting from lever 4. Disk 42 is held in position by a snap ring 44. This disk is generally circular but it is formed with an arcuate peripheral recess or notch 45 and has imprinted thereon two numerical symbols "20" and "36" positioned in such a manner that, in one of its extreme positions, disk 42 blocks one of the windows 40 and 41 so that one of the numerical symbols "20" or "36" is visible through this blocked window, while in the other extreme position of disk 42, the other reading window 41 or 40 is similarly blocked by the disk and the corresponding other information or symbol "36" or "20" can be viewed through this window.

The two extreme positions of cover disk 42 can be determined by any suitable means, for example by two cam portions extending or pressed out from the cover disk and engaging a notch or recess in the film feed lever. In one of the windows 40 or 41 open in a particular instance, the numerical data of the scale disk 37 and, when the film feed lever is in its rest position, an indicator 38 or 39 corresponding to the particular window position is visible.

The divisions of scale 37 correspond to the pitch of ratchet wheel 24 so that, at each image step, the scale is moved by one division relative to the reading marks 38 and 39. The scale is arranged in such a manner that it indicates the number of image or picture areas, or frames, which are still available for exposure in a particular case, and will indicate the value "zero" when the last picture area or frame of a film is disposed in the picture window of a camera.

When a film is inserted into the camera, at the commencement of the opening movement of back wall 3, the ratchet wheel 24, and with it the holder 35 and scale disk 37, are biased by spring 26 back to the starting position. As illustrated in FIG. 1, opposite the indicator 39 visible through the window 41, a point below the scale value "22" may be noted. Window 40 is closed by the cover disk 42 and this exposes the symbol "20" on the cover disk. This means that the counting mechanism is then adjusted to a film having 20 picture frames or areas. If a film having this number of picture areas or frames is inserted into the camera, and if the back wall is then closed and that part of the film which has been exposed during insertion of the film is wound onto spool 12 by two strokes of lever 4, the scale value 20 will be located opposite the reading mark 43. This means that twenty picture areas on the film are available for exposure.

On the other hand, if the camera is charged with the film having thirty-six picture areas, upon insertion of this film into the camera the cover disk 42 is displaced to its other extreme position shown in FIG. 1 by broken lines. In this other extreme position, window 41 is closed so that the numeral "36" on the disk 42 is visible and this means that the counting mechanism is adjusted to a film having this number of picture areas. Conversely, reading window 40 will be opened and the reading mark 38, the end point of the scale, and the scale of disk 37 starting with the value "36" are visible.

Figure 4:
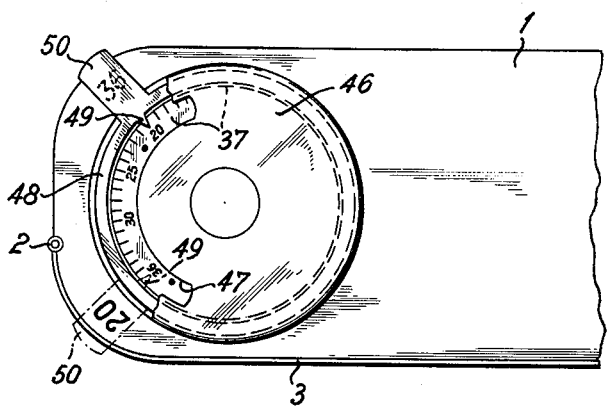
FIG. 4 is a view similar to FIG. 1 illustrating a modified form of the invention.

In the embodiment illustrated in FIG. 4, the bottom wall of the camera is again indicated at 1 as carrying the scale disk 37 of the film counting mechanism. The construction of the film counting mechanism can be the same as that shown in FIGS. 1, 2 and 3 or can differ therefrom. However, the operation of the film counting mechanism is essentially equal to that described in connection with FIGS. 1, 2, and 3, in any case. Thus, scale disk 37 always starts at an identical initial position and always operates against the force of a return spring to indicate the supply of film remaining.

In this embodiment of the invention, the scale disk is overlapped by a cap 46 provided with an arcuate window 47, in place of the film lever 4 of FIGS. 1, 2, and 3. A graduated ring 48 is rotatably arranged in the cap 46 and has an indicator 49 pointing to the scale of disk 37 and an adjusting handle 50 projecting from cap 46. The bottom wall 1 of the camera carries both figures "20" and "36." In the position shown in FIG. 4, symbol "36" is covered by adjusting handle 50 while symbol "20" is visible, and this indicates that the counting device is adjusted with respect to a film supply having twenty picture areas. The parts are shown in a position in which the inserted film has been advanced to the first picture to be exposed. The position of the adjusting lever 50 and of the indicator 49 when adjusted to a film having thirty-six picture areas is indicated by the broken lines. Thus, in accordance with the number of pictures in the film being used, the adjusting handle 50, and with it the indicator 49, are correspondingly adjusted. The parts are releasably retained in adjusted position by any suitable releaseable latch means.

From the foregoing, it will be apparent that the counting disk or scale carrier can be arranged in any desired position on the camera, such as within a film feed lever or it may be separated from a film feed lever and mounted on another portion of the camera. The film feed lever can also be an adjusting button which is moved in one direction of rotation only. Furthermore, by a corresponding arrangement of the indicators, counting of the film supply can be started at values other than "20" or "36" which are given above solely as examples.

While specific embodiments of the invention have been shown and described in detail to illustrate the application of the principles of the invention, it will be understood that the invention may be embodied otherwise without departing from such principles.

What is claimed is:

1. In a photographic camera of the type including a casing having an openable wall, film feed mechanism, a picture frame counter movable in a selected direction by the mechanism in advancing the film, spring means connected to the counter and biasing it to move in the reverse direction to return to a fixed starting point, and latch means operatively associated with the openable wall and released upon opening of the latter, the latch means, when the wall is closed, engaging the counter and inhibiting such reverse movement thereof: the improvement comprising a scale carrying member movable with said counter and having a single scale in which successive scale graduations correspond to successive picture frames and the total number of graduations corresponds to the maximum possible number of picture frames on any film useable in the camera; plural indicator positions associated with said scale carrying member and spaced longitudinally of the scale thereon; plural film length symbols, corresponding, respectively, to the total number of picture frames on films of different lengths, operatively associated with said member and spaced longitudinally of the scale thereon, said symbols being equal in number to the number of said indicator positions; and a screening element movable parallel to said scale carrying member to selected positions in each one of which said element exposes an indicator at only one of said indicator positions and exposes only a selected one of said symbols at another indicator position.

2. In a photographic camera as claimed in claim 1, a cover device overlying said scale carrying member and formed with window means exposing said indicator positions.

3. In a photographic camera as claimed in claim 1, said scale carrying member being a rotatable substantially circular disk; a circular cover overlying said disk and formed with a pair of circumferentially spaced arcuate windows each exposing one of said indicator positions; said screening element being a circular disk disposed between said cover and said scale carrying disk and oscillatable about the axis of said scale carrying disk; said screening element having an arcuate notch extending around part of its periphery and of such a length that when said notch exposes the indicator position beneath one of said windows, said screening element will block the other of said windows; said screening element having said symbols printed thereon at each end of said notch and arranged to be exposed through said windows when said screening element is blocking a particular window; and a fixedly positioned indicator at each of said indicator positions.

4. In a photographic camera as claimed in claim 1, releasable means for latching said screening element in each of its adjusted positions.

5. In a photographic camera as claimed in claim 3, said film feed mechanism including an oscillatable film feed handle coaxial with said scale carrying disk.

6. In a photographic camera as claimed in claim 5, said circular cover forming a portion of said film feed handle; said screening element having an operating portion projecting radially beyond said cover.

7. In a photographic camera as claimed in claim 1, an indicator movable relative to said scale between said indicator positions.

8. In a photographic camera as claimed in claim 1, said scale carrying member being a rotatable substantially circular disk; and a ring forming said screening element and coaxially embracing said scale carrying disk, said ring having an indicator cooperable with said scale and an adjusting handle projecting radially therefrom.

9. In a photographic camera as claimed in claim 8, said scale carrying disk being mounted on another wall of said casing; said symbols being applied to said wall and there being a pair of symbols each specific to a particular length of film; the symbol corresponding to the length of film not then being used in the camera being covered by said adjusting handle when said indicator is moved to the proper position for coordinating said scale carrying disk with the length of film then in the camera.

10. In a photographic camera as claimed in claim 8, means releasably arresting said ring in each of its adjusted positions.

References Cited in the file of this patent

UNITED STATES PATENTS

| | | |
|---|---|---|
| 387,841 | Allderige | Aug. 14, 1888 |
| 1,175,852 | Wells | Mar. 14, 1916 |
| 2,930,303 | Yoshiharu Sago et al. | Mar. 29, 1960 |
| 2,936,687 | Bundschuh et al. | May 17, 1960 |

FOREIGN PATENTS

| | | |
|---|---|---|
| 596,783 | Germany | May 11, 1934 |